United States Patent
Horn et al.

[11] Patent Number: 5,979,839
[45] Date of Patent: Nov. 9, 1999

[54] FITTING FOR FASTENING A LENGTHWISE OBJECT TO A WALL

[75] Inventors: Thomas Horn; Hans Jürgen Schiefer, both of Hannover, Germany

[73] Assignee: Alcatel, France

[21] Appl. No.: 08/886,930

[22] Filed: Jul. 2, 1997

[30] Foreign Application Priority Data

Jul. 2, 1996 [DE] Germany .......................... 196 26 453

[51] Int. Cl.$^6$ .................................................. F16L 3/08
[52] U.S. Cl. ........................... 248/71; 248/74.1; 248/74.4
[58] Field of Search .......................... 248/65, 74.1, 74.4, 248/201, 176.1, 187.1, 316.6, 71, 74.2

[56] References Cited

U.S. PATENT DOCUMENTS

| | | | |
|---|---|---|---|
| 492,593 | 2/1893 | Taylor | 248/74.4 |
| 1,111,360 | 9/1914 | Carpenter et al. | 248/74.4 |
| 3,704,848 | 12/1972 | Trebes et al. | 248/187.1 X |
| 4,020,531 | 5/1977 | Ahrens et al. | 248/74.4 X |
| 4,502,653 | 3/1985 | Curtis, Jr. | 248/74.1 X |
| 4,635,886 | 1/1987 | Santucci et al. | 248/74.1 X |
| 4,835,933 | 6/1989 | Yung | 248/74.4 X |
| 5,195,704 | 3/1993 | Louie | 248/74.4 X |
| 5,752,681 | 5/1998 | Janssen et al. | 248/74.2 X |

FOREIGN PATENT DOCUMENTS

| | | | |
|---|---|---|---|
| 11 21 357 | of 0000 | France . | |
| 1131413 | 2/1957 | France | 248/74.1 |
| 504271 | of 0000 | Germany . | |
| 69103678 | of 0000 | Germany . | |
| 9 212 516 U | of 0000 | Germany . | |
| GM 1852656 | of 0000 | Germany . | |
| GM 6602374 | of 0000 | Germany . | |
| GM 7000332 | of 0000 | Germany . | |
| PS 9 03 600 | of 0000 | Germany . | |
| 893675 | 12/1953 | Germany | 248/74.4 |
| 451945 | 8/1936 | United Kingdom | 248/74.4 |
| 1342715 | 6/1974 | United Kingdom | 248/74.4 |
| 1575084 | 9/1980 | United Kingdom | 248/74.4 |

*Primary Examiner*—Derek J. Berger
*Attorney, Agent, or Firm*—Ware, Fressola, Van der Sluys & Adolphson LLP

[57] ABSTRACT

A fitting for fastening a cable (2) to a wall (1) is indicated, which comprises a base (6) to be fastened to the wall (1) and a cap (7). The end of the base (6) which in the installed position faces away from the wall has a trough (8) for receiving the cable (2), which in the installed position is closed by the cap (7). The base (6) has three separate faces (9, 10, 11) which form the corners of a triangle for the attachment to the wall (1). The part of the cap (7) which in the installed position is applied against the cable is elastically deformable.

8 Claims, 2 Drawing Sheets

FITTING FOR FASTENING A LENGTHWISE OBJECT TO A WALL

BACKGROUND OF THE INVENTION

1. Technical Field

The invention concerns a fitting for fastening a lengthwise object to a wall, comprising a base that is attached to the wall, which has a trough for receiving the object in the end that faces away from the wall in the installed position, and a cap to be fastened to the base which in the installed position closes off the trough by being applied against the object.

2. Description of the Prior Art

In the sense of the invention "lengthwise objects" may be cables of all kinds or tubes. Radiating high frequency cables—in the following called RHF cables for short—have special significance because long lengths of them are routed in tunnel paths. The following considers the routing of RHF cables as representative of all other possible applications.

RHF cables are used for example for the transmission of information between trains and fixed stations. To that end they must be installed in relatively accurate positions along predetermined paths, for example on the wall of tunnels. This requires fittings which are easy to install and securely hold the RHF cables. In addition the fittings must be designed so that damage to the relatively sensitive RHF cables can be prevented during installation.

The fitting known from the DE-U-9 212 516 uses fittings which comprise a support bracket that can be closed by a cover. There is a space between both parts for receiving an RHF cable. A closed surface of the support bracket can be screwed to a wall by means of a foot. The cover is fastened to the support bracket by a nonmetallic hinge which allows it to swing and be locked to the bracket. In the RHF cable receiving space, spring elements are fastened for tolerance balancing to the support bracket as well as to the cover, which in the installed position are applied against the RHF cable.

SUMMARY OF THE INVENTION

It is an object of the present invention to further develop the prior art fitting previously described, so that its construction and installation are simpler. This object is fulfilled by the invention in that:

the base has three separate faces forming the corners of a triangle for the attachment to the wall, and the part of the cap which in the installed position is applied against the RHF cable is elastically deformable.

The three attachment faces of the base simplify the secure attachment to a wall. In this case, the quality of the wall surface is of subordinate importance because in all cases the three-point attachment allows the base to be fastened to the wall in a wobble-free manner. An especially precise position is therefore not required because potential deviations from this position are equalized by the cap of the fitting, which is applied against the RHF cable with its elastically deformable part. This not only allows to overcome installation deviations and variations in the size of the RHF cable being laid, but assures the damage-free installation of the RHF cable.

The invention will be fully understood when reference is made to the following detailed description taken in conjunction with the accompanying drawings.

DETAILED DESCRIPTION OF THE INVENTION

Figure 1:
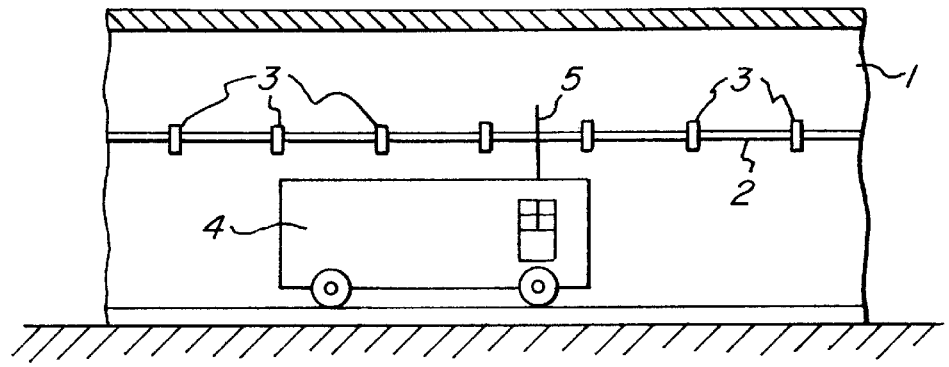
FIG. 1 is a schematic illustration of the installation path of an RHF cable.

FIG. 1 schematically illustrates a section of a tunnel on a railway line. An RHF cable 2 is laid on the wall 1 of the tunnel and is fastened thereto by fittings 3 made of plastic. A schematically indicated vehicle 4 is located on the rail in the railway tunnel and is equipped with an antenna 5. It is possible for signals to be transmitted between the RHF cable 2 and the antenna 5.

Figure 2:
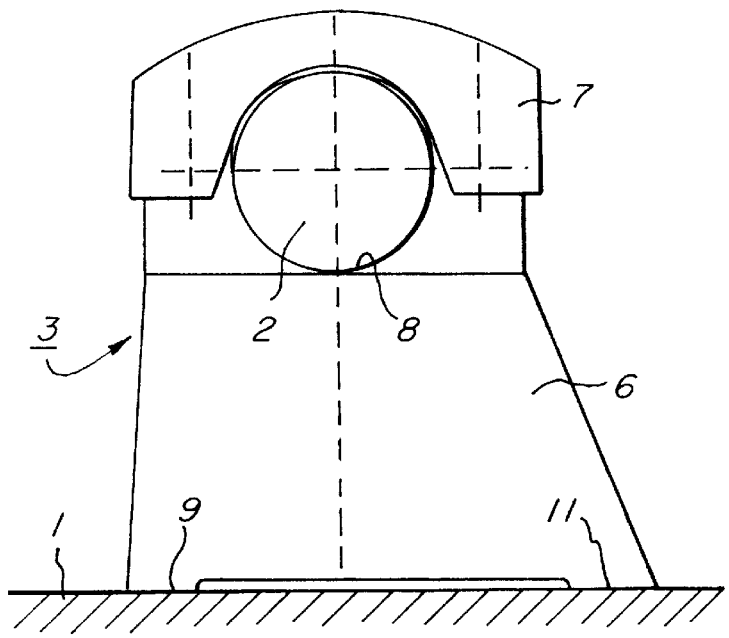
FIG. 2 is an enlarged lateral view of a fitting according to the invention.

According to FIG. 2, the fittings 3 comprise a base 6 to be attached to the wall 1 and a cap 7 which must be securely fastened to the base 6. Both parts are made of plastic. For example, a glass fiber reinforced plastic can be used for the base 6. The cap 7 is preferably made of polyamide. The RHF cable 2 is arranged between the base 6 and the cap 7. To that effect the base 6 has a semi-circular trough 8 at the end that faces away from the attachment side. In the installed condition, the RHF cable 2 is at a distance from the wall 1 of the tunnel which corresponds to the height of the base 6.

Figure 3:
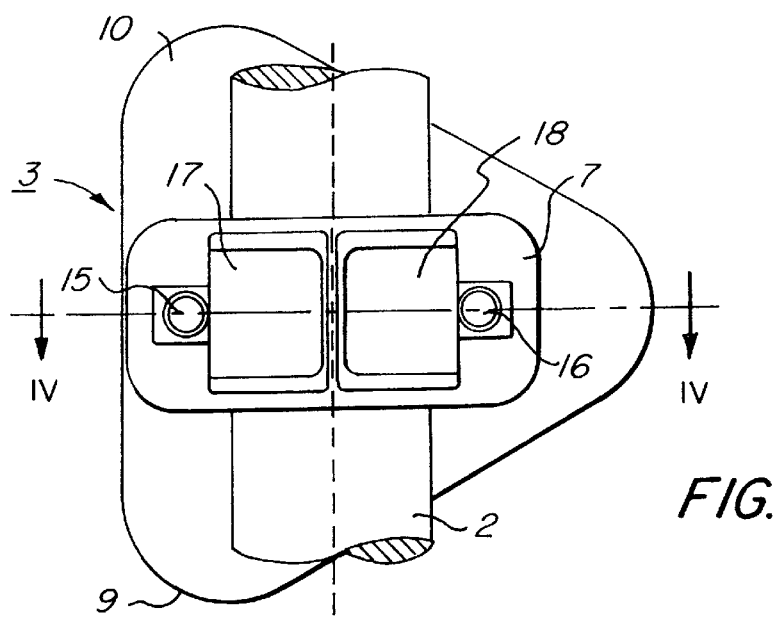
FIG. 3 is a top view of the fitting in FIG. 2.
Figure 5:
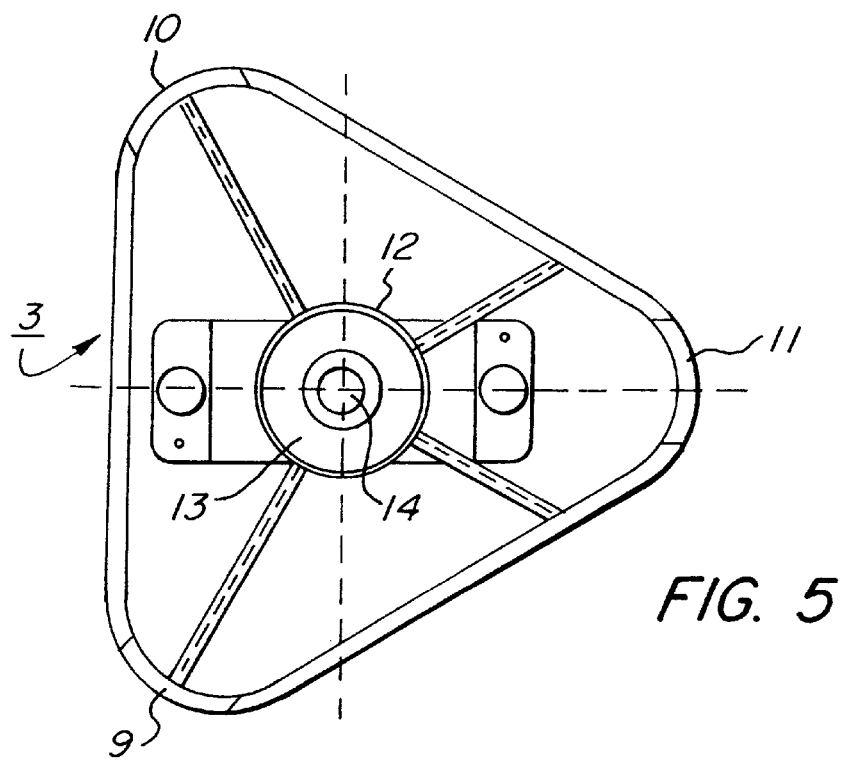
FIG. 5 is a bottom view of the fitting.

According to FIGS. 3 and 5, the base 6 can possibly be configured as a triangular hood. However, the hood can also be round or oval or have another geometric form. In all of its possible configurations, the base 6 has three separate faces 9, 10 and 11 at the end designed for the attachment to the wall 1, which according to FIG. 5 form the corners of an isosceles triangle for example. A tube 12 is centrally positioned on the base 6 and is used to fasten it and thereby the fitting 3 to the wall 1. To that effect the tube 12 has a transverse wall 13 at the attachment end to which attachment means can be fastened. In the illustrated configuration example, the transverse wall 13 has a hole 14 through which a screw (not shown) can be inserted.

Figure 4:
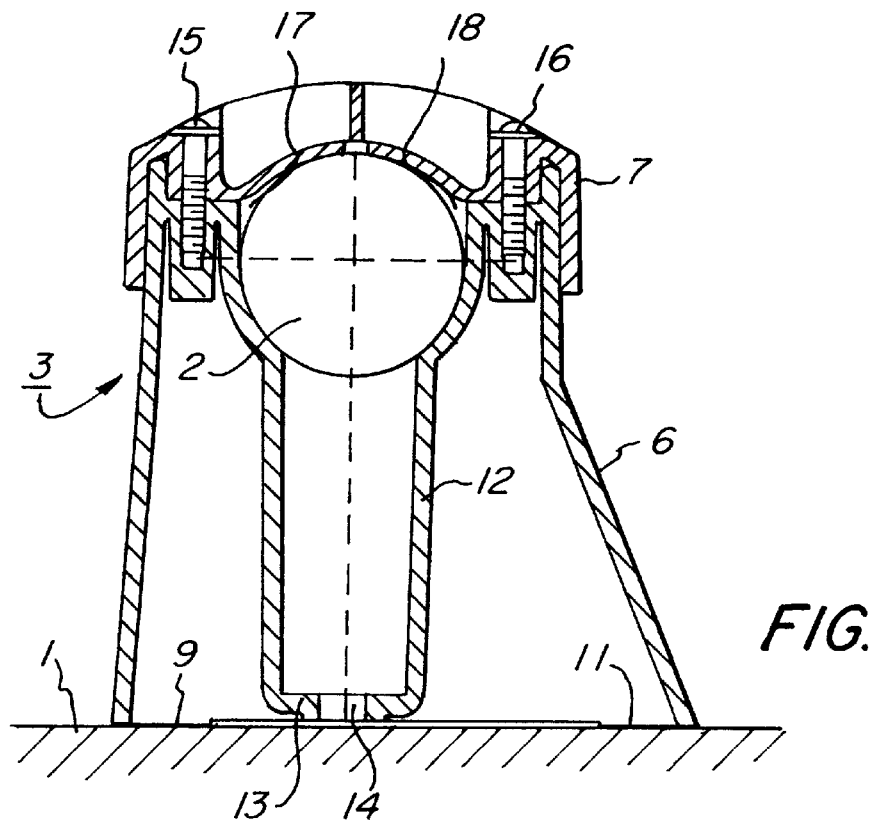
FIG. 4 is a cut through the fitting in FIG. 3 along line IV—IV.

In the installed position, the cap 7 of fitting 3 closes off the trough 8 of the base 6. It can for example be screwed to the base 6 by means of screws 15 and 16. However, a spring-loaded latch connection of the cap 7 to the base 6 is also possible. The cap 7 is elastically deformable in its central area designed for application to the RHF cable 2. To that effect, the cap 7 can be equipped for example with two wide resilient tongues 17 and 18 in accordance with FIGS. 3 and 4, which in the installed position are securely placed against the RHF cable 2 and press against it. The material of the cap 7 is selected so that the resilient characteristic of the tongues 17 and 18 is permanently assured. As already mentioned, such a material is polyamide for example.

The following is an example of the procedure for installing an RHF cable 2 to a wall 1:

First, the bases 6 of the fittings 3 are mounted along the installation path at a predetermined distance from each other. In that case, the bases 6 are supported by the wall 1 through their three attachment faces 9, 10 and 11. These three attachment faces in the shape of a triangle ensure a secure and wobble-free seat for the bases 6 on the wall 1. Subsequently, the RHF cable 2 is inserted into the troughs 8 of the bases 6. After installing the caps 7 which straddle cable 2 and which are preferably screwed to the base 6, the RHF cable 2 is attached to the wall 1 in the correct position.

The preferred embodiment described above admirably achieves the objects of the invention. However, it will be appreciated that departures can be made by those skilled in the art without departing from the spirit and scope of the invention which is limited only by the following claims.

What is claimed is:

1. A fitting for fastening a lengthwise object to a wall, the fitting comprising:
   (a) a base adapted for attachment to the wall, the base having a trough, to receive the object, at an end of the base that is adapted to face away from the wall when the base is installed thereon, the base having three separate faces projecting from said base for separate abutment against the wall, the faces being arranged in a triangle pattern, thereby assuring wobble-free attachment of said base to said wall, regardless of wall surface quality; and wherein the base defines a central tube open at one end, adapted to extend from said wall and transitioning at its open end into said trough and having a transverse portion adapted to be adjacent said wall and adapted to receive attachment means which are adapted to engage in said wall; and
   (b) a cap adapted to be attached to the base which, in an installed position, closes off the trough, said cap having an elastically deformable part which, in the installed position, is adapted to be applied against the object and is designed to be elastically deformed by the object.

2. A fitting as claimed in claim 1, wherein the base is configured as a hood, containing said open-ended central tube, which is used to attach the base to the wall, the central tube having an attachment end with a transverse wall, serving as said transverse portion, and adapted to receive said attachment means, and having an open opposite end which transitions into the trough.

3. A fitting as claimed in claim 2, wherein the elastically deformable part of the cap is provided by resilient tongues.

4. A fitting as claimed in claim 3, further including at least one screw for attaching the cap to the base.

5. A fitting as claimed in claim 2, wherein said cap is adapted to straddle an object inserted in said trough and is adapted to be secured to said base at two points, on respectively opposite sides of said inserted object.

6. A fitting as claimed in claim 1, wherein the elastically deformable part of the cap is provided by resilient tongues.

7. A fitting as claimed in claim 6, further including at least one screw for attaching the cap to the base.

8. A fitting as claimed in claim 1, further including at least one screw for attaching the cap to the base.

* * * * *